United States Patent Office 3,326,862
Patented June 20, 1967

3,326,862
POLYURETHANES PREPARED FROM POLYTHIOETHERS FREE OF SULFONIUM COMPLEXES
Kuno Wagner, Leverkusen, and Julius Peter, Odenthal, Germany, assignors to Farbenfabriken Bayer Aktiengesellschaft, Leverkusen, Germany, a corporation of Germany
No Drawing. Original application Nov. 17, 1960, Ser. No. 69,839, now Patent No. 3,217,043, dated Nov. 9, 1965. Divided and this application Aug. 31, 1965, Ser. No. 507,596
Claims priority, application Germany, Nov. 21, 1959, F 29,897
2 Claims. (Cl. 260—77.5)

This invention relates to polyurethane plastics and a method of preparing the same. More particularly, it relates to polyurethane plastics having improved properties which are prepared from novel polythioethers. This application is a division of application Ser. No. 69,839, filed by us on Nov. 17, 1960, which application is now U.S. Patent 3,217,043.

It has been heretofore known to product valuable plastics from polythioethers having either terminal OH or SH groups and a molecular weight of from 400 to 10,000 by reaction with organic di- or polyisocyanates. These plastics can be obtained in the form of hard and elastic foam materials, elastomeric materials, lacquires, films, foils, molding compositions, adhesives, textile coatings and the like depending upon the choice of reaction and the quantities in which they are employed and also on the order in which the individual reaction steps are carried out.

Polythioethers such as those mentioned above and having oxygen and sulfur bridges and terminal hydroxyl or mercapto groups, employed as starting materials for the production of plastics are produced by condensing one or more dihydric or polyhydric alcohols and/or one or more thioalcohols, which may contain any number of thioether groups in the molecule and which contain at least one hydroxyl group in a beta or gamma position to a sulfur atom either by themselves or with one or more dihydric alcohols, polyhydric alcohols, thioalcohols, thioether alcohols, or thioether thioalcohols. The condensation performed in the preparation of the polythioethers is preferably carried out at a temperature of about 150° C. to about 250° C. Generally, the condensation requires the presence of an etherification catalyst such as, for example, aromatic sulfonic acids, and the esters thereof, sulfuric acid, amido sulfonic acid, esters of aliphatic sulfonic acids, acid salts such as, potassium bisulfate, phosphoric acid, phosphoric acid anhydride and maleic acid anhydride. The etherification catalysts are preferably employed in an amount of from about 0.1 to about 5 percent.

It has been the belief heretofore that the polythioethers prepared by the above-described processes were linear products when difunctional starting materials were employed.

The present invention, however, is based on the discovery that polythioethers prepared from dihydric starting materials are not strictly linear condensation products as was formally supposed, but are highly branched compounds, the branch chains of which terminate in an OR or SH group. This degree of branching found in the polythioethers has a deleterious effect on the physical properties of plastics produced from polythioethers which is particularly apparent in elastomeric polyurethanes.

In all of the prior art methods for manufacturing polythioethers an alkylation reaction occurs at the sulfur atoms of the polythioethers which leads to branching of the chain in addition to the predominant linear chain formation which proceeds by way of oxygen and sulfur bridges. As a result of this branching, polythioethers containing sulfonium complexes are obtained. Experiments demonstrate that polythioethers which were thought to be linear exhibit only a minor portion of sulfonium complexes at the commencement of the condensation at which time the OH concentration is high. This is believed due to the relatively labile types of bonds in these complexes which are split under the prevailing alcoholic and thermal conditions present at the commencement of condensation. The major portion of the reacting bifunctional components is thus linked in linear form. As the concentration of OH groups decreases, however, branching through the sulfonium complex becomes increasingly more apparent. For example, when thiodiglycol is condensed in the presence of either p-toluene sulfonic acid, phosphoric acid, phosphoric acid anhydride or maleic acid anhydride, polythioethers are obtained in which the degree of branching increases with increasing catalyst concentration. That is, as the reaction proceeds the rate of formation of the sulfonium complexes increases. An example of a polythioether containing branching by way of a sulfonium complex is shown in the following formula:

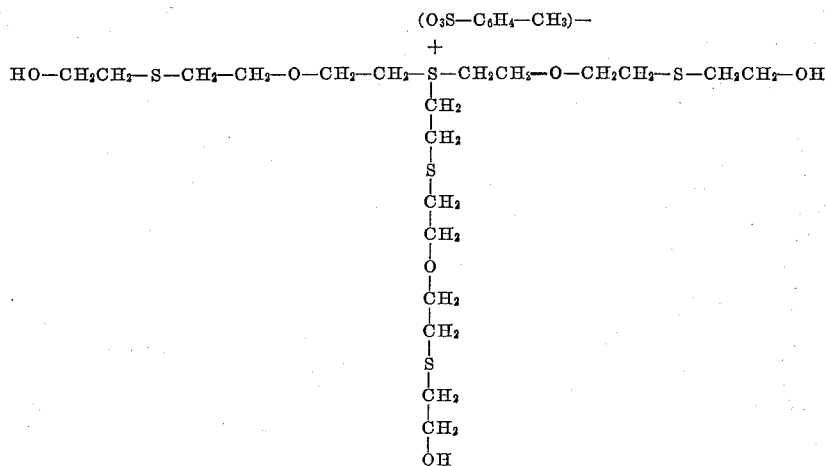

Upon thorough investigation of the supposed linear polythioethers and in particular those derived from thiodiglycol or from thiodiglycol and triethylene glycol which polythioethers have an average molecular weight of about 2,000, this being the preferred molecular weight for the production of polyurethane plastic by the diisocyanate polyaddition process, it has been shown that above 20 percent of the polythioether carry at least three hydroxyl groups.

It is possible to determine the degree of branching of the supposed polythioethers by splitting them by the Hoffmann degradation method. If a polythioether which has a molecular weight of about 2,000 and an hydroxyl number of about 50, which polythioethers are preferred for employment in the isocyanate polyaddition process, is subjected to a hydrolytic splitting reaction in the presence of $NH_3$ at a temperature above 100° C. and at elevated pressure, the hydroxyl number of the degraded product, when compared with the hydroxyl number of the initial polythioether is found to increase to about 60. Therefore, it can be seen that the degraded polythioether contains about 20 percent more reactive groupings than the initial polythioether.

In the example stated immediately above the purported linear polythioether has a sulfur content of about 31 grams per 100 grams of polythioether. Since 17 grams of the newly formed OH are equivalent to one sulfonium bond, it can be determined that 0.73 gram of sulfur or about 2.4 percent of the sulfur atoms are used in the formation of sulfonium complexes. Although this value appears to be relatively small, the functionality of the polythioethers is increased to an exceptional degree.

It can be estimated from the above that supposedly linear polythioethers produced by conventional methods contain four molecules out of five on the average which are linear and contain only two hydroxyl groups while the fifth molecule is branched and carries at least three hydroxyl groups.

It is, therefore, an object of this invention to provide an improved method of making linear polythioethers. It is another object of this invention to provide a method for removing the sulfonium complexes from heretofore supposed linear polythioethers. It is still another object of this invention to provide a method of making polyurethane plastics from polythioethers having substantially no sulfonium complexes and organic isocyanates. It is a further object of this invention to provide improved polyurethane plastics.

The foregoing objects and others, which will become apparent from the following description, are accomplished in accordance with the invention, generally speaking, by providing an improved process for preparing linear polythioethers, which polythioethers are subsequently reacted with isocyanates to produce polyurethane plastics, the linear polythioethers being prepared by treating polythioethers prepared by conventional methods and which contain sulfonium complexes with alkyl acceptors. That is, treating the sulfonium complex containing polythioethers with ions or molecules which contain nucleophilic groups. Nucleophilic is defined in the third edition of Organic Chemistry, by Fieser and Fieser, published by D. C. Heath and Company, Boston, Massachusetts on page 328 as a reactant that donates electrons for example, an anion (attracted by a positive center). Any compound containing nucleophilic groups may be used in the process of this invention such as, compounds containing hydroxyl ions, aliphatic, hydroaromatic, araliphatic, and aromatic, primary secondary and tertiary amines, and hydrazine derivatives, ammonia, metal alcoholates, metal phenolates, mercaptides, thiocyanic acid salts of inorganic or organic bases and organic compounds containing active methylene groups such as, for example, diethyl malonate.

The inventive procedure i.e. the removal of the sulfonium complexes is dependent on teh action of a nucleophilic center only. The chemical nature of the compound which the polythioether is treated is not critical besides this nucleophilic center. However, in the practice of the procedure it is reasonable to use such reactants with nucleophilic groups which can easily be removed after the treatment. It is preferred that the compounds containing nucleophilic centers have a low vapour pressure or are readily soluble in water or organic solvents in order that they may be removed by extraction.

The alkyl acceptors utilized in the process of this invention initiate a cleavage at the positive sulfur atom of the formula set forth above. That is, the sulfonium complex is split at the carbon-sulfur bond. The thioether chain which is split off in the process is taken up by the alkyl acceptor while the anionic part of the sulfonium complex is liberated in the form of the acid which is neutralized in the presence of a base to form a salt.

As a specific illustration of the mechanism by which the process of this invention takes place, reference is made to the formula set forth above. For example, when hydroxyl ions are utilized for the removal of the sulfonium complex one of the branches shown in the above formula for example, the verticle branch is split off and combines with the hydroxyl ions thus producing a thioether glycol. The anionic part of the complex, that is, the part shown in the brackets in the formula combines with the $H^+$ counterpart of the $OH^-$ to form toluene sulfonic acid which is in turn neutralized.

Any of the alkyl acceptors stated generally above may be used in the process of this invention. Suitable specific examples of these compounds include such as, for example, water, sodium hydroxide, potassium hydroxide, calcium hydroxide, barium hydroxide, trimethyl amine, triethyl amine, methyl amine, diethyl amine, cyclohexyl amine, dimethyl cyclohexyl amine, benzyl amine, N-dimethyl aniline, aniline, hydrazine, methyl hydrazine, N,N'-diethyl hydrazine, ammonia, sodium methylate, potassium ethylate, sodium glycolate, sodium phenolate, sodium butyl mercaptide, potassium butyl mercaptide, sodium dodecyl mercaptide, potassium thiocyanate, sodium thiocyanate, ammonium thiocyanate, dimethyl ammonium thiocyanate, trimethyl ammonium thiocyanate, malonic acid diethyl ester, acetoacetic ester, acetylacetone, cyanoacetic acid ethyl ester and the like.

The polythioethers as mentioned above may be prepared by any of the known methods. For example, they may be prepared by condensing a thioether glycol with itself or with a di- or polyhydric alcohol. Also polyalkylene oxides may be used in the condensation process with a thioether glycol for the production of polythioethers. The polythioethers may be prepared by any of the processes disclosed in U.S. Patents 2,518,245, 2,862,972 and 2,900,368. Any suitable di- or polyhydric alcohol may be used in the preparation of the polythioethers such as, for example, ethylene glycol, diethylene glycol, propylene glycol, butylene glycol, amylene glycol, gylcerol, trimethylol propane, xylylene glycol and the like. Any suitable thioether glycol may be used such as, for example, thiodiglycol, 3,3'-dihydroxylpropyl sulfide, 4,4'-dihydroxybutyl sulfide, 1,4-(beta-hydroxyethyl) phenylene dithioether, and the like.

In order to obtain elastomeric polyurethanes from the polythioethers of this invention, it is essential to start from strictly linear polythioethers if the urethane elastomers are to exhibit excellent physical properties. Of course, polythioethers which are prepared from compounds having a functionality higher than two may also be used as the sulfonium complexes may be removed by the process of this invention without affecting the branching of the polythioether which is through carbon bonds. That is, should a trihydric alcohol for example be used in the preparation of a polythioether, branching will occur both by way of sulfonium complexes and through carbon bonds. The latter is a result of using the trihydric alcohol and will not be affected by the treatment which dissolves the sulfonium complexes. The former type of cross-linking, however, occurs whether or not compounds having a functionality greater than two are used. This type of cross-linking is removed by the process of this invention.

The treatment of the polythioethers with compounds containing nucleophilic groups to remove the sulfonium complexes is carried out with mixing at a temperature of from about 70° C. to about 180° C. for a period of time of from about 0.5 to about 18 hours. The amount of the compound used to remove the sulfonium complexes should be from about 2 to about 20 parts per 100 parts of polythioether. This treatment with an alkyl acceptor may be carried out in the presence of a solvent, if necessary. If OH ions are employed as the alkyl acceptor, it is preferred to carry out the treatment in the aqueous phase of in the presence of a metal alcoholate or a monohydric or dihydric alcohol as a solvent for the sulfonium complexes. A preferred method for removing the sulfonium complexes is by treating the polythioethers with organic bases in the presence of either water, alcohols or thioalcohols. The most preferred method, however, for removing the sulfonium complexes from the polythioethers to render the polythioether substantially linear is by treating the polythioether with ammonia within the elevated temperature range set forth above for from about 0.5 to about 18 hours and under a pressure of from about 42 to about 640 p.s.i. in the presence of water, monohydric or polyhydric alcohols or mercaptans.

Any suitable monohydric or polyhydric alcohol may be used such as, for example, ethanol, proponal, butanol, isopropanol, isobutanol, thiodiglycol, amyl alcohol, benzyl alcohol, ethylene glycol, propylene glycol, 1,4-butane diol, 1,3-butane diol and the like. Any suitable mercaptan may be used such as, for example, ethanethiol, butanethiol, ethanedithiol, benzenedithiol, cyclohexanethiol and the like. It is, of course, advantageous to use splitting agents which can be removed from the polythioether after the treatment. The removal of the splitting agent is accomplished by any suitable technique such as, for example, by filtration.

The acid etherification catalyst used in the preparation of the polythioether is also quantitatively removed along with the agents used for removing the sulfonium complexes if they have not been previously removed before treating the polythioethers. In the embodiment wherein a polythioether is treated with ammonia and water under heat and pressure by agitating within an autoclave for example, the etherification catalyst and ammonia are removed by filtration in the form of ammonium salts or as an ammoniacol solution of asparaginic acid in a finely divided state. It is important that the said etherification catalyst be removed since any remaining etherification catalyst may lead to the formation of sulfonium groups during the conventional drying process which precedes the polyaddition reaction of the polythioether with organic isocyanates. The agents used for removing the sulfonium complexes and acid catalysts can be separated from the polythioethers by any suitable method known in the art such as, for example, by simple phase separation, differences in solubility, filtration or on the basis of different vapor pressures.

The polythioethers thus freed from etherification catalyst and from agents for removing the sulfonium complexes are then reacted with one or more polyisocyanates and cross-linking agents, if necessary, to produce a polyurethane plastic.

The polythioethers prepared in accordance with this invention may be reacted together with one or more polyesters or polyethers and organic polyisocyanates to form products having a high molecular weight. Any suitable organic polyisocyanate may be used in the process of this invention to prepare polyurethane plastics utilizing the linear polythioethers described herein such as, for example, ethylene, diisocyanate, propylene diisocyanate, tetramethylene diisocyanate, pentamethylene diisocyanate, octamethylene diisocyanate, undecamethylene diisocyanate, dodecamethylene diisocyanate, 3,3'-diisocyanatodipropylether, etc.; cyclopentylene-1,3-diisocyanate, cyclohexylene-1,4-diisocyanate, 2,4-tolylene diisocyanate, 2,6-tolylene diisocyanate and mixtures of 2,4- and 2,6-tolylene diisocyanate, xylylene-1,4-diisocyanate, xylylene-1,3-diisocyanate, 4,4'-diphenylmethane diisocyanate, 2-nitrodiphenyl-4,4'-diisocyanate, 4,4'-diphenyl propane diisocyanate, p-isocyanatobenzyl isocyanate, m-phenylene diisocyanate, p-phenylene diisocyanate, naphthylene-1,4-diisocyanate, napthylene-1,5-diisocyanate, furfurylidene diisocyanate, p,p',p''-triphenylmethone triisocyanate, diphenyl-4,6,4'-triisocyanate and the like. The reaction products of polyhydric alcohols with an excess of a diisocyanate for example, the reaction product of one mol of trimethylol propane with three mols of toluylene diisocyanates. Also masked polyisocyanates which liberate free isocyanate groups upon heating such as, for example, uretdione diisocyanates and trimerized polyisocyanates may be used.

High quality elastomeric materials are obtained in accordance with this invention by reacting the linear polythioethers described above with organic diisocyanates in a quantity in excess of that necessary for strictly linear lengthening of the chain and then adding cross-linking agents such as, glycols, diamines, water and amino alcohols and then casting directly into a mold wherein cross-linking occurs which results in an elastomeric product. The quantity of isocyanate used in excess of the polythioether is from about 1.5 to about 4 mols of isocyanate per mol of polythioether.

Water or any suitable glycol, diamine or amino alcohol may be used as a chain extending agent such as, for example, ethylene glycol, propylene glycol, 1,3-butylene glycol, 1,4-butylene glycol, amylene glycols and the like; ethylene diamine, propylene diamine, 1,3-butylene diamine, 1,4-butylene diamine and the like; ethanol amine, propanol amine, butanol amine and the like.

The linear polythioethers can also be reacted with an excess of diisocyanate to prepare an isocyanate modified polythioether having free —NCO groups. This prepolythus obtained can subsequently be reacted with any of the glycols, diamines or amino alcohols mentioned above in quantities such that the resulting material containing active hydrogen containing groups to prepare a storable intermediate product. This storable intermediate product can then subsequently be converted into an elastomeric material in a second stage by reacting it with an additional quantity of a diisocyanate or other cross-linking agent such as, for example, formaldehyde.

The polythioethers prepared in accordance with this invention which are ether linear or contain branched chains through carbon atoms and which have been treated in accordance with this invention to remove the sulfonium complexes therefrom are also useful starting agents in the production of cellular polyurethanes. The polythioethers are reacted with diisocyanates or polyisocyanates and water with vigorous stirring and with the addition of accelerators and emulsifiers whereby foaming takes place. The reaction can be carried out in a single stage or in two stages, the latter being accomplished by first forming an isocyanate terminated prepolymer and reacting this with water to form a cellular plastic. Any of the accelerators, emulsifiers or cross-linking agents set forth in U.S. Reissue Patent 24,514 may be used to prepare cellular plastics from the thioethers containing no sulfonium complexes. The polyurethane plastic prepared in accordance with this invention utilizing the polythioethers which have been pretreated to remove the sulfonium complexes present in the molecular chain show the following properties as compared with products of polythioethers which have not been pretreated to remove the sulfonium complexes therefrom.

It is possible to produce storable products from the pretreated polythioethers because it is possible to react equivalent quantities of hydroxyl and isocyanate groups whereby the production of longer chains is made possible. This is not the case with polythioethers, which have not been pretreated in accordance with the invention to remove the sulfonium complexes, for the reason that preliminary branching occurs which results in products having fractions with two high Defo elasticity values. The products prepared from the pretreated polythioethers have properties comparable with products of similar structures prepared by utilizing polyether or polyester resins. The processing time of casting resins prepared in accordance with the above-stated procedure is increased over 100 percent by utilizing the pretreated polythioethers. The quantity of samples prepared by utilizing the pretreated polythioethers shows remarkable improvement over products prepared from polythioethers not treated in accordance with the invention to remove the sulfonium complexes. Improvements in strength values show an increase of up to 600 percent and improvements in the breaking elongation are found to be more than 100 percent.

Cross-linking reactions in connection with storable products for example, formaldehyde, permit the strength values to be increased by about 400 percent.

The invention is further illustrated by the following examples in which parts are by weight unless otherwise specified.

*Example 1*

About 1500 parts of a polythioether having an hydroxyl number of about 44 and prepared by condensing about 30 percent triethylene glycol and about 70 percent thiodigylcol in admixture with about 0.1 percent phosphoric acid and about 1 percent maleic anhydride as catalyst are heated with about 100 parts of ammonia and about 100 parts of water in a stirrer-type autoclave for about two hours at about 140° C. and a pressure of about 42 atm. gauge. Thereafter, ammonia is removed and the now linear polythioether is freed from water in vacuo. After removing the water, the material is filtered while hot, whereby the etherification catalyst and the total quantity of maleic acid are left in the form of ammonia salts or as ammoniacal solutions of asparaginic acid in a finely divided state and can be easily filtered. The hydroxyl number has risen from 44 to 67. The yield is 1470 parts as compared to the original 1500 parts. About 300 parts of the polythioether are dehydrated for about 30 minutes at about 130° C. in vacuo at about 14 mm. Hg. Thereafter, about 61 parts of 1,5-naphthylene diisocyanate are incorporated by stirring at about 125° C. After about 6 minutes, about 6 parts of 1,4-butylene glycol are added. The resulting pourable melt is then cast into waxed molds. The elements which are removed from the molds after about 45 minutes and after heating for about 24 hours at about 110° C., show the following substantially improved properties as compared with test elements produced in an analogous manner with a polythioether which has not been pretreated:

|  | Untreated | Pretreated |
| --- | --- | --- |
| Tensile Strength, kg./cm.² | 20 | 155 |
| Breaking Elongation, percent | 174 | 630 |
| Permanent Elongation, percent | 4 | 19 |
| Elasiticity, percent | 51 | 60 |
| Shore Hardness, degrees | 84 | 79 |
| Ring-Test Strength | 9 | 22 |

*Example 2*

About 500 parts of a polythioether treated as described in Example 1 are dehydrated together with about 30 parts of m-dioxethyl toluidine at about 14 mm. Hg at about 130° C. The temperature is allowed to fall to about 90° C. and about 122 parts of 4,4-diphenyl methane diisocyanate are incorporated by stirring. After about 8 minutes, the viscous melt is poured onto a support and is finally heated for about 48 hours at 100° C. A product which can be satisfactorily rolled into a smooth sheet is obtained, this product having a Defo value below 50, while the Defo elastic fraction thereof still cannot be measured. In contrast thereto, the material produced from the branched, untreated polythioether has a Defo value of 300 and a Defo elastic fraction of 48.

About 30 parts of carbon black and about 1 part of stearic acid are rolled on a roller into each about 100 parts by weight of the storable sheet and finally about 0.8 part by weight of para-formaldehyde is incorporated by rolling on a cooled roller. After vulcanization for about 40 minutes at 151° C. and about 4.0 atm. steam pressure, the product shows the following mechanical properties:

|  | Untreated Starting Material | Treated Starting Material |
| --- | --- | --- |
| Tensile Strength, kg./cm.² | 30 | 150 |
| Breaking Elongation, percent | 80 | 250 |
| Elasticity, percent | 35 | 46 |
| Ring-Test Strength | 2–3 | 7 |
| Shore Hardness, degrees | 74 | 69 |

The product produced from a pretreated polythioether exhibits excellent resistance to water even after being immersed for 14 days in water at 100° C. The product has a swelling value of 5.7 percent $H_2O$.

*Example 3*

(A) About 1500 parts of a polythioether having an hydroxyl number of about 44 and prepared by condensing about 30% of triethylene glycol and about 70% thiodiglycol in admixture with about 0.1% phosphoric acid and about 1% maleic anhydride as catalyst are heated with about 80 parts of trimethyl amine and about 100 parts of water in a stirrer-type autoclave for about 3 hours at about 150° C. After removing the trimethyl amine and the water in vacuo the material is filtered while hot whereby the etherification catalyst and the maleic acid are separated. The hydroxyl number of the polythioether has risen from 44 to 63. The yield is 1460 parts.

(B) 1500 parts of a polythioether having an hydroxyl number of about 100 and prepared by condensing about 30% of triethylene glycol and about 70% of thiodiglycol in admixture with 0.5% p-toluene sulphonic acid as catalyst are heated with about 50 parts of hydrazine hydrate and 150 parts of water in a stirrer-type autoclave for about 3 hours at about 150° C. After removing the water and hydrazine hydrate in vacuo the material is filtered while hot and the formed salts separated thereby. Air is passed through the filtered polythioether at 120° C. The hydroxyl number has risen from 100 to 108. The yield is 1460 parts.

(C) About 1500 parts of a polythioether having an hydroxyl number of 55 and prepared by condensing thiodiglycol with 0.5% of p-toluene sulphonic acid as catalyst are heated with about 300 parts of ethanol and 300 parts of liquid ammonia in a stirrer-type autoclave for about 3 hours at about 150° C. After removing the ammonia and the ethanol in vacuo the material is filtered from formed salts and impurities. The linear polythioether thus obtained has an hydroxyl number of about 64. The yield is 1460 parts.

(D) About 1500 parts of polythioether having an hydroxyl number of 51 and prepared by condensing thiodiglycol with 0.2% of phosphoric acid as catalyst are heated while stirring with 200 parts of water and 200 parts of 1-n-sodium hydroxide at 100° C. Steam is passed through the reaction mixture. After 10 hours the material is several times stirred with water and washed neutral. Finally, water is removed in vacuo, the polythioether dissolved in benzene and last traces of water removed by azeotropic distillation. The anhydrous benzene solution of the polythioether is filtered while hot and separated from impurities. The linear polythioether has an hydroxyl number of 59.5. The yield is 1440 parts.

(E) About 1500 parts of a polythioether having an hydroxyl number of about 51 and prepared by condensing thiodiglycol in admixture with 0.2% phosphoric acid as catalyst are heated with 300 parts of malonic acid diethyl ester and 20 parts of powdered calcium carbonate and 1500 parts of toluene for 10 hours at 110° C. The hot suspension is filtered with suction and separated in vacuo from toluene and malonic acid diethyl ester. The hydroxyl number of the polythioether has risen to 56.5. The yield is 1460 parts.

500 parts of the polythioether treated according to (A) to (E) are processed in accordance with Example 2 to a millable storable polyurethane which is cross-linked with formaldehyde. The following table gives the amounts of 4,4'-diphenyl methane diisocyanate and m-dioxethyl toluidine to be reacted with the five polythioethers. The figures are parts by weight.

|   | 4,4'-diphenyl methane diisocyanate | m-Dioxethyl toluidine |
|---|---|---|
| A | 93 | 15 |
| B | 142 | 15 |
| C | 93 | 15 |
| D | 86 | 15 |
| E | 84 | 15 |

The millable gums obtained are rolled on a roller while incorporating 30 parts of carbon black and 1 part of stearic acid for each 100 parts of millable gum. Finally, about 0.8 part by weight of para-formaldehyde are incorporated by rolling on a cooled roller. After vulcanisation for about 40 minutes at 151° C. and about 4 atm. steam pressure the products show the following mechanical properties.

| Tensile Strength | Breaking Elongation, percent | Elasticity, percent | Ring-Test Strength | Shore Hardness, deg. |
|---|---|---|---|---|
| (A) 144 kg./cm.² | 265 | 49 | 10 | 67 |
| (B) 140 kg./cm.² | 300 | 36 | 12 | 74 |
| (C) 138 kg./cm.² | 320 | 48 | 11 | 69 |
| (C) 106 kg./cm.² | 210 | 47 | 7 | 70 |
| (E) 99 kg./cm.² | 190 | 48 | 6 | 68 |

It is, of course, to be understood that the polythioethers treated in accordance with this invention can be reacted with any of the polyisocyanates set forth above to produce polyurethane plastics. Also, any of the materials listed above for treating the polythioethers to remove the sulfonium complexes may be used in place of that used in the working examples.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method for making a polythioether polyurethane plastic which comprises (1) mixing at a temperature of from about 70° C. to about 180° C. a polythioether having sulfonium complexes and an alkyl acceptor containing ammonia in the presence of a member selected from the group consisting of water, alcohol, a mercaptan and mixtures thereof whereby a polythioether substantially free from sulfonium complexes is prepared, and (2) reacting the resulting polythioether with an organic polyisocyanate to prepare said polyurethane plastics.

2. The process of claim 1 wherein a cross-linking agent is included in the reaction (2) to produce a cross-linked polythioether polyurethane.

References Cited
UNITED STATES PATENTS

| | | | |
|---|---|---|---|
| 2,871,227 | 1/1959 | Walter | 260—77.5 |
| 2,989,512 | 6/1961 | Nischk | 260—77.5 |
| 2,900,368 | 8/1959 | Stilmar | 260—77.5 |
| 3,217,043 | 11/1965 | Wagner et al. | 260—609 |

DONALD E. CZAJA, *Primary Examiner.*

LEON J. BERCOVITZ, *Examiner.*

M. C. JACOBS, F. McKELVEY, *Assistant Examiners.*